United States Patent [19]

Graf

[11] Patent Number: 5,450,832
[45] Date of Patent: Sep. 19, 1995

[54] DUAL FUEL SYSTEM

[75] Inventor: Bruce R. Graf, 5588 W. 175th St., Tinley Park, Ill. 60477

[73] Assignee: Bruce R. Graf, Tinley Park, Ill.

[21] Appl. No.: 215,146

[22] Filed: Mar. 21, 1994

[51] Int. Cl.⁶ ............................................. F02M 21/02
[52] U.S. Cl. ...................................... 123/515; 123/525
[58] Field of Search .................. 123/525, 527, 27 GE, 123/515

[56] References Cited

U.S. PATENT DOCUMENTS

| | | | |
|---|---|---|---|
| 4,369,751 | 1/1983 | Batchelor et al. | 123/527 |
| 4,617,904 | 10/1986 | Pagdin | 123/525 |
| 4,843,558 | 6/1989 | Bergmann et al. | 123/527 |
| 5,092,305 | 3/1992 | King | 123/27 GE |
| 5,150,690 | 9/1992 | Carter et al. | 123/527 |
| 5,237,981 | 8/1993 | Palletta et al. | 123/527 |
| 5,367,999 | 11/1994 | King et al. | 123/527 |
| 5,377,645 | 1/1995 | Moore | 123/525 |
| 5,377,647 | 1/1995 | Jones | 123/527 |

Primary Examiner—Henry C. Yuen
Assistant Examiner—Erick Solis
Attorney, Agent, or Firm—Hill, Steadman & Simpson

[57] ABSTRACT

A dual fuel system for motor vehicles having an internal combustion engine with electronic fuel injection equipment designed for use with gasoline fuel, wherein a delivery system for an alternate fuel, such as compressed natural gas or the like, is provided. The alternate fuel delivery system comprises a pilot valve regulated by a separate electronic fuel injector connected to the vehicle's electronic control module is also connected on one side of the pilot valve to a pressurized tank of gaseous fuel, and on the other side to the vehicle's throttle body for delivery of the alternate fuel thereto in the proper amounts called for by the vehicle's original electronic control module. The same electronic control module regulates the amount of alternate fuel such as compressed natural gas delivered to the engine when operating on the alternate fuel as well as the amount of gasoline when operating in that mode.

15 Claims, 1 Drawing Sheet

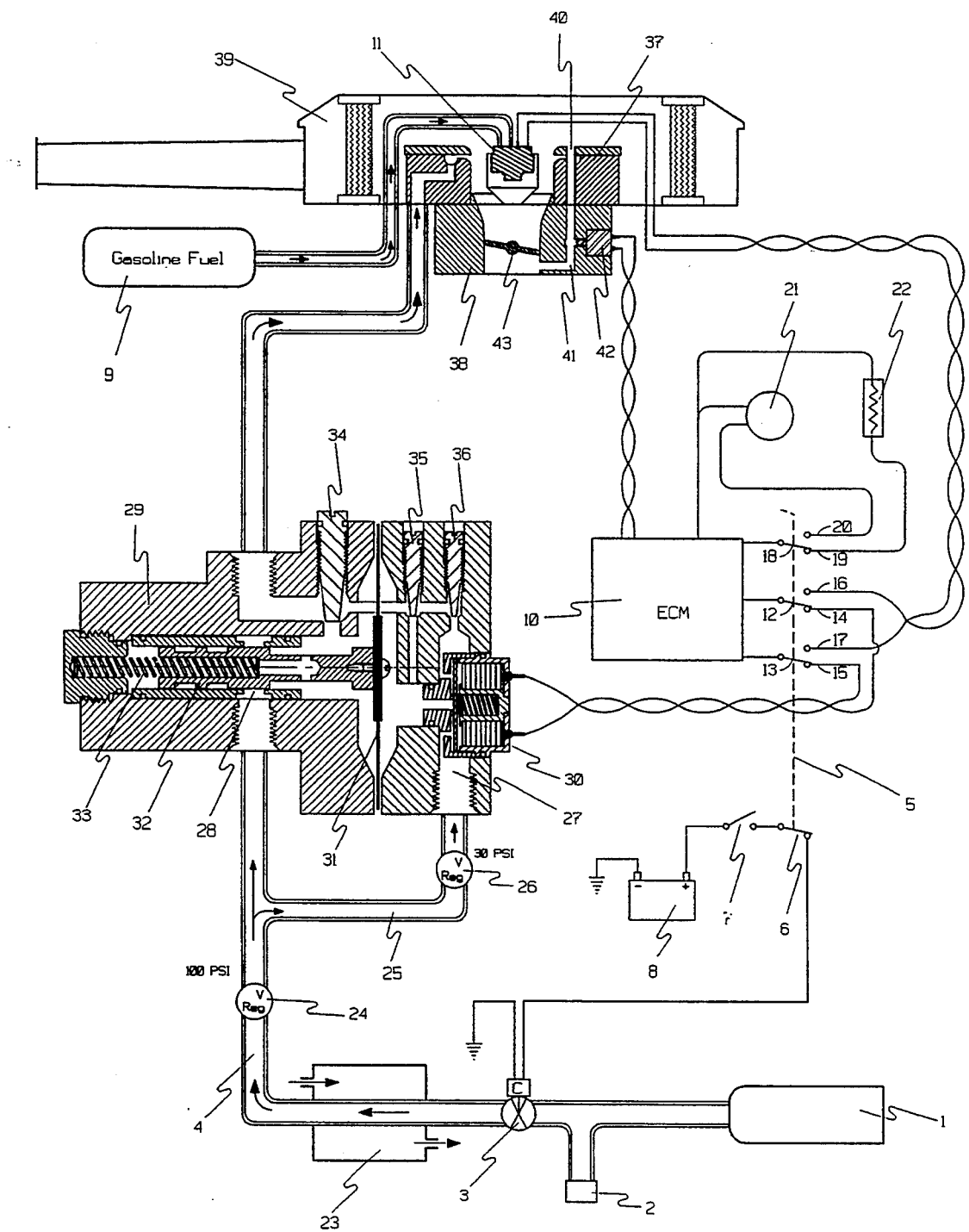

DUAL FUEL SYSTEM

BACKGROUND OF THE INVENTION

This invention relates to the field of dual fuel systems for vehicles with internal combustion engines, and in particular vehicles with engines designed to use gasoline as their primary fuel wherein an alternate fuel system can be added to enable use of an alternate fuel by switching back and forth between gasoline and the alternate fuel.

Prior art devices of this kind of which the inventor is aware include those described in the following United States patents.

U.S. Pat. No. 5,228,423 discloses a dual fuel engine which uses liquid fuel such as gasoline or gaseous fuel such as compressed natural gas, wherein separate intake passages into the combustion chamber of each cylinder and separate fuel supply devices are provided for the gaseous fuel and for the liquid fuel. Both intake passages are provided with intake valves, and both intake valves are actuated when the liquid fuel is used but substantially only one of the intake valves is actuated when the gaseous fuel is used.

U.S. Pat. No. 4,878,475 discloses a dual fuel system for internal combustion engines, one fuel such as propane to start the engine, to operate it at idle speed and to supplement the other fuel during acceleration, and the second such as gasoline to operate the engine at its normal working speed. Vacuum controlled valves deliver the one fuel such as propane to the carburetor. The primary fuel such as gasoline is delivered to the carburetor by the usual fuel pump.

U.S. Pat. No. 4,606,322 discloses a dual fuel control and supply system for internal combustion engines such as diesel, but not necessarily confined to diesel engines, an injector pump to deliver the principal liquid fuel under pressure to the cylinders, an electronic control unit, and an electrically controllable variable flow regulator to receive a gaseous alternative fuel and deliver controlled quantities to the cylinders as signalled by the electronic control unit.

U.S. Pat. No. 4,594,201 discloses a multi-fuel system for internal combustion engines, comprising a non-venturi type of carburetor having a metered inlet and means for controlling the pressure of each fuel in accordance with the stoichiometric ratio of that fuel to assure proper fuel/air ratio is delivered to the mixing chamber of the carburetor without requiring any change in either the carburetor or engine when a different fuel is used.

U.S. Pat. No. 4,576,137 discloses a gas and a diesel dual fuel engine, wherein the engine has an electronic governor circuit adapted to receive both a speed signal representing the actual speed of the engine and a set speed signal representing a predetermined command speed of the engine, electric actuators to actuate a diesel fuel injection pump and a gaseous fuel regulating valve in response to the signal from the electronic governor circuit, with a switching control circuit to switch operation between diesel fuel and gaseous fuel.

U.S. Pat. No. 4,531,497 discloses a natural gas adaptor system for automobiles which normally run on gasoline, including a compressor driven by the vehicle's engine to compress low pressure natural gas up to a higher pressure, and an air mixing delivery system for delivering the compressed natural gas to the carburetor.

U.S. Pat. No. 4,354,477 discloses a multi-fuel carburetor with a rotary mixing valve which has multiple vanes to control the flow of main and secondary fuels into a mixing chamber to momentarily increase the octane rating of the fuel charge during acceleration, such as by mixing in a quantity of alcohol with gasoline in a predetermined ratio, for example as 1 part alcohol to 10 parts gasoline.

U.S. Pat. No. 4,031,864 discloses a multiple fuel supply system for an internal combustion engine wherein phase separation of a gasoline-methanol blend in a single tank is induces by adding a minor amount of water sufficient to guarantee separation into an upper gasoline phase and a lower methanol-water phase. Separate fuel pickups and separate level indicators are provided for each phase. Either gasoline or methanol can be supplied to the engine by the vehicle's fuel delivery system.

U.S. Pat. No. 3,659,574 discloses a natural gas powered engine having a dual fuel feed apparatus and control whereby the engine can operate on both natural gas and gasoline. Two carburetors are mounted in parallel at the intake manifold and a switch mechanism is provided to switch between natural gas from one carburetor and gasoline from the other.

SUMMARY OF THE INVENTION

The dual fuel system in accordance with the present invention provides a number of improvements and advantages over the prior art.

The present invention is adapted for motor vehicles which come from the factory equipped with an electronic fuel injection system for use with gasoline as the fuel. The fuel system in accordance with this invention is able to utilize the original equipment electronic control module to regulate and deliver an alternate fuel, such as compressed natural gas to give one example, to the intake manifold and cylinders without modification of the throttle body except to add a venturi mixer and provide a port through the side wall of the venturi mixer for the alternate fuel to enter.

A pilot valve serves as the regulator for the alternate fuel to deliver the proper amount of alternate fuel to the venturi mixer and throttle body as called for by the original equipment electronic control module which senses the demands of the engine for fuel. The pilot valve has a through passageway chamber with inlet and outlet ports, the opening of such passageway controlled by a stem valve, a diaphragm to move the stem valve from a completely closed position to any degree of partially open up to fully open, and a pressure regulating chamber separated by the diaphragm from the through passageway chamber.

A pilot control port opens to the pressure regulating chamber, and a branch alternate fuel line with a pressure regulator to reduce the pressure of the compressed natural gas or other alternate fuel to a desired pilot control pressure is connected to the pilot control port. A separate electronic fuel injector is secured to the pilot valve in communication with the pilot control port to control the amount of the alternate fuel at the pilot control pressure which enters the pressure regulating chamber in response to signals received from the original equipment electronic control module.

When more of the alternate fuel is allowed to enter the pressure regulating chamber, the diaphragm is forced to flex in the direction of the through passageway chamber which moves the stem valve in the direction which opens the through passageway wider, thus allowing a greater amount of the alternate fuel to flow through to the venturi mixer, throttle body, intake manifold and cylinders.

When the electronic control module senses decreased demand for fuel, it signals the electronic fuel injector affixed to the pilot valve to let less of the alternate fuel at the pilot control pressure to enter the pressure regulating chamber. The diaphragm then relaxes toward its at rest position bringing the stem valve toward a narrower opening of the through passageway thereby delivering less of the alternate fuel to the engine.

No other system known to the prior art is able to use an alternate fuel such as compressed natural gas in a motor vehicle originally equipped for operation on gasoline which for all practical purposes makes use of the same sensing and control equipment for delivering the right amount of alternate fuel to the engine as used for delivering the right amount of gasoline to the engine when switched to that mode. The result is that the engine is able to operate just as well on the alternate fuel as on gasoline, and a minimum of additional parts is needed.

The switching mechanism to switch between gasoline and the alternate fuel is also simplified in this invention, requiring only a relay to switch the electronic control module from the electronic fuel injector for gasoline to the one provided at the pilot valve for the alternate fuel, and vice versa. The switching mechanism at the same time opens a solenoid valve for flow of the alternate fuel from its supply tank when in that mode, and closes such valve to stop the flow of alternate fuel from the supply tank when switched to the gasoline mode. In addition, the switching mechanism cuts out a temperature sensor circuit when switched to the alternate fuel mode, and reconnects it when switched to the gasoline mode.

Other features, improvements and advantages of this invention will become apparent from the more detailed description which follows and by reference to the accompanying drawing.

BRIEF DESCRIPTION OF THE DRAWING

FIG. 1 is a section view of the venturi mixer, throttle body and gasoline electronic fuel injector positioned in registration therewith connected to the gasoline supply tank, and a section view of the pilot valve and alternate fuel electronic fuel injector affixed thereto, showing its connection to the alternate fuel tank, the electronic control module and other electronic components shown in block form and schematically.

DESCRIPTION OF PREFERRED EMBODIMENT

A dual fuel system for internal combustion engines in accordance with this invention enables the engine to run on the usual gasoline fuel, and when desired to run on an alternate fuel such as compressed natural gas by throwing a switch.

The invention includes a pressurized storage tank 1 having a fill port 2 to receive an alternate fuel supply such as compressed natural gas. A solenoid valve 3 opens and closes the alternate fuel supply line 4 from the pressurized storage tank 1, the solenoid valve 3 being controlled by the fuel selector switch 5. When the switch 5 is in its position to close contacts 6, the solenoid valve 3 is energized and moves to its valve open position. When switch 5 is moved to its position to open contacts 6, the solenoid valve 3 is not energized and moves to its normally biased valve closed position.

The ignition switch 7 must also be in its contacts closed position to complete a circuit from the battery 8 to the solenoid valve 3.

When solenoid valve 3 is in its valve closed position, gasoline is then supplied to the engine from the gasoline supply tank 9.

An electronic control module 10 which controls the gasoline electronic fuel injector 11 is switched to control the amount of gasoline being delivered to the engine when fuel selector switch 5 is switched to its position to open contacts 6. At such time movable contacts 12 and 13 are switched from stationary contacts 14 and 15 to stationary contacts 16 and 17, thereby completing a circuit across electronic fuel injector 11 to regulate the amount of gasoline fuel to the engine.

At such time, movable contact 18 is switched from stationary contact 19 to stationary contact 20 which completes a circuit across temperature sensor 21 and the electronic control module 10. This sensor is provided to sense the temperature of the engine and feed such temperature signal to the electronic control module 10. This enables the electronic control module 10 to in turn energize the electronic fuel injector 11 to make proper adjustments regarding the amount of gasoline fuel being delivered to the engine when it is operating on that fuel.

The sensor 21 is not required when the engine is switched for operation to the alternate fuel such as compressed natural gas. At such time, movable contact 18 is switched to stationary contact 19 which completes a circuit across a fixed 180 ohm resistor 22 and the electronic control module 10 for use during operation of the engine on such alternate fuel which can flow through the now open solenoid valve 3. The fixed ohm resistor 22 varies with the engine on which the temperature sensor 21 is used for operation in the gasoline mode. The resistance of the resistor 22 should be that which simulates the resistance which the sensor 21 would provide at normal operating temperature of the vehicle.

A heat exchange 23 is provided adjacent the alternate fuel line to pre-heat the alternate fuel as it passes to the pressure regulator 24. Such pre-heating provides protection against freezing the control valve and regulator due to impurities in the expanding gas. Heat is provided by engine coolant passing through the shell of the heat exchanger, or by some other heat source such as an electrical heater or exhaust gas.

Pressure of the alternate fuel is the supply tank is about 2500 pounds per square inch (psi). The regulator 24 reduces the pressure in the alternate fuel supply line to between 100 psi to 200 psi.

The alternate fuel supply line 4 branches after passing through regulator 24 to direct a portion of the alternate fuel through branch line 25, a secondary regulator 26 and then to pilot control port 27. The secondary regulator 26 reduces the alternate fuel pressure to 30 psi. Fuel from this branch fuel line 25 after passing through secondary regulator 26 and being reduced to 30 psi is also connected to supply idle fuel.

The main branch of alternate fuel supply line 4 leads to primary port 28 of pilot control valve 29. The pilot control valve 29 controls flow of the alternate fuel to the engine using the fuel injector signal from electronic control module 10, normally installed at the factory for engines originally equipped with electronic fuel injection.

When fuel selector switch 5 is switched to open solenoid valve 3 and thereby switch operation of the engine from gasoline to the alternate fuel supply, movable contacts 12 and 13 are switched to stationary contacts 14 and 15 thereby interrupting the circuit to gasoline fuel injector 11 and completing a circuit between the electronic control module 10 and alternate fuel injectors 30, located in the bonnet of the pilot control valve 29.

As the electronic control module 10 calls for fuel, the alternate fuel injectors 30 are turned on and off at a rate determined by the electronic control module 10 based on the requirements of the engine at that particular time.

When the electronic control module 10 calls for more fuel at the alternate fuel injectors 30, secondary fuel at 30 psi from branch alternate fuel supply line 25 flows into the chamber of the pilot control valve 29 at its bonnet side. This causes pressure to build up against the diaphragm 31 which in turn displaces the spool 32 until it uncovers primary port 28 allowing primary fuel at between 100 to 250 psi to flow through the pilot control valve 29.

The spool 32 continues to open thereby widening the opening of port 28 allowing more of the alternate fuel to flow through the pilot control valve 29 to the engine. As more primary fuel at 100 to 250 psi flows through port 28, pressure on the port 28 side of the diaphragm increases until it equalizes the pressure on the bonnet side of the pilot control valve. At such point, the spool 32 and the amount which it has opened port 28 remains fixed until either more of the alternate fuel is called for or less.

When less fuel is called for by the electronic control module 10, the duty cycle portion of the signal of the alternate fuel injectors 30 in the bonnet of the pilot control valve 29 decreases. Thus, as less secondary fuel is called for at pilot control port 27, pressure on the bonnet side of the pilot control valve 29 decreases allowing pressure of primary alternate fuel through port 28 on the opposite side of the diaphragm 31 to move the spool 32 in the direction which closes port 28 thereby reducing flow of primary alternate fuel through the pilot control valve.

A coil compression spring 33 biases the spool 32 to the position where it completely closes port 28 when the engine is turned off or switched to operate on gasoline.

An output adjustment valve 34 is provided which can be rotated by a screw driver to narrow or widen the primary flow passageway through the pilot control valve 29.

A pilot pressure adjustment valve 35, rotatable by a screw driver, is provided to narrow or widen the pilot pressure passageway.

An idle compensation adjustment valve 36, rotatable by a screw driver, is provided to narrow or widen the idle fuel passageway.

These adjustment valves 34, 35 and 36 are adjusted at initial set up only and do not require further adjustment for normal use. The electronic control module 10 makes all air/fuel adjustments as called for by the engine during normal operation.

Primary alternate fuel flows from the pilot control valve 29 to a venturi mixer 37 mounted on top of the throttle body 38 inside of the original equipment air filter 39. The venturi mixer 37 allows unrestricted air flow to the engine while in the gasoline fuel mode and mixes alternate fuel with air when in the alternate fuel mode.

A tube 40 is inserted through the venturi mixer 37 to the auxiliary air supply passageway 41 in the throttle body 38. An electronic valve 42 narrows and widens this auxiliary air supply passageway 41 as signaled by the electronic control module 10 to which it is connected. This is important during idle because the throttle plate 43 is closed. If auxiliary passageway 41 does not allow fresh air to flow not mixed with any fuel, the engine will run poorly regardless of the throttle opening when operating on alternate fuel. This passage must bypass the venturi mixer 37 to allow fresh air to be added to the air/fuel mixture allowing the electronic control module 10 to control the idle speed and provide additional mixture control at wider throttle openings when operating on alternate fuel.

I claim:

1. A dual fuel system for an internal combustion engine, comprising an internal combustion engine having an existing electronic fuel injection system to provide gasoline fuel for operation thereof, said existing electronic fuel injection system including an existing electronic control module to sense fuel demand conditions of said engine and transmit control signals responsive thereto, a throttle body having a throat, a throttle therein, a venturi member having a passageway in communication with said throat of said throttle body and upstream therefrom, a gasoline electronic fuel injector to receive said control signals from said electronic control module in registration with said throat of said throttle body and connected to a supply of gasoline fuel, a temperature sensor to sense the temperature of said engine connected in circuit with said electronic control module for transmission of engine temperature signals thereto, an alternate electronic fuel injection system to deliver an alternate fuel to operate said engine, said alternate electronic fuel injection system including alternate electronic fuel injection means for connection to said existing electronic control module to receive said control signals therefrom when connected thereto, alternate fuel regulating means operably associated with said alternate fuel to said engine for operation thereof on said alternate fuel, including a supply of said alternate fuel, and fuel selection switch means to switch operation of said engine from said existing electronic fuel injection system which provides gasoline fuel for operation thereof to said alternate electronic fuel injection system which provides an alternate fuel for operation of said engine and vice versa wherein said alternate fuel regulating means includes a pilot control valve, said pilot control valve having a diaphragm member separating a primary flow passageway on one side thereof and a control pressure chamber on the opposite side thereof, a flow inlet port opening to said control pressure chamber, a primary flow inlet port opening to said primary flow passageway at one end thereof and a primary flow outlet port opening to said primary flow passageway at the other end thereof, a control valve member provided in said primary flow passageway between said inlet port and said outlet port movable between a valve open and a valve closed position adjustable to any position therebetween in response to movement of said diaphragm.

2. A dual fuel system for an internal combustion engine as set forth in claim 1, wherein said alternate electronic fuel injection means comprises an alternate fuel electronic fuel injector to receive said control signals from said electronic control module, said alternate fuel electronic fuel injector including a through passageway, an inlet opening to said through passageway, an outlet opening to said through passageway and closure means to open, close and vary the opening of said through passageway responsive to said control signals from said electronic control module, said inlet of said through passageway of said alternate fuel electronic fuel injector being positioned in registration with said control flow inlet port opening to said control pressure chamber, said outlet of said through passageway of said alternate fuel electronic fuel injector being positioned to open to said control pressure chamber.

3. A dual fuel system for an internal combustion engine as set forth in claim 1, wherein said fuel selection switch means includes an electrical switching circuit to switch operation of said internal combustion engine from one of said fuels to the other, comprising a power source, a first circuit connected between said electronic control module and said gasoline electronic fuel injector for operation of said engine on said gasoline fuel, a second circuit connected between said electronic control module and said alternate fuel electronic fuel injector for operation of said engine on said alternate fuel, and a switching component connected between said power source and said first and second circuits to operatively connect either one of said circuits to said power source and disconnect the other.

4. A dual fuel system for an internal combustion engine as set forth in claim 3, including a pressurized alternate fuel supply tank, an alternate fuel line leading from said alternate fuel supply tank to said primary flow inlet port of said pilot control valve, a solenoid valve in said alternate fuel line to open and close said fuel line, said solenoid valve being connected in said second circuit.

5. A dual fuel system for an internal combustion engine as set forth in claim 3, wherein said temperature sensor is connected in said first circuit, being thereby connected and operative when said engine is switched for operation on gasoline, being disconnected and inoperative when said engine is switched for operation on said alternate fuel.

6. A dual fuel system for an internal combustion engine as set forth in claim 5, including a fixed resistor, said fixed resistor being connected in said second circuit, said fixed resistor having a resistance to simulate that which said temperature sensor impresses on said first circuit at normal operating temperature of said engine.

7. A dual fuel system for an internal combustion engine as set forth in claim 4, including a heat exchanger positioned relative to said alternate fuel line to preheat said alternate fuel as it flows in said line from said alternate fuel supply tank to said venturi member and said throttle body.

8. A dual fuel system for an internal combustion engine as set forth in claim 4, including a first alternate fuel pressure regulator in said alternate fuel line to reduce alternate fuel pressure therein to a range which includes one hundred pounds per square inch.

9. A dual fuel system for an internal combustion engine as set forth in claim 8, including a branch alternate fuel line leading from said alternate fuel line on the downstream side of said first alternate fuel pressure regulator to said control flow inlet port opening to said control pressure chamber of said pilot control valve, a second alternate fuel pressure regulator in said branch alternate fuel line to reduce alternate fuel pressure therein to a range which includes thirty pounds per square inch.

10. A dual system for an internal combustion engine comprising an electronic control module to sense fuel demand of said engine and transmit control signals responsive thereto, an electronic fuel injector connected to receive said control signals from said electronic control module, a pilot control valve, said pilot control valve having a movable member separating a primary flow passageway on one side thereof and a control pressure chamber on the opposite side thereof, a control flow inlet port opening to said control pressure chamber, a primary flow inlet port opening to said primary flow passageway at one end thereof and a primary flow outlet port opening to said primary flow passageway at the other end thereof, a control valve member provided in said primary flow passageway between said inlet port and said outlet port movable between a valve open and valve closed position adjustable to any position therebetween in response to movement of said movable member, a pressurized fuel supply tank to receive a supply of pressurized gaseous fuel, a first fuel line leading from said pressurized fuel supply tank to said primary flow inlet port of said pilot control valve, a second fuel line leading from said primary flow outlet port of said pilot control valve to fuel entrance means to a manifold leading to combustion chambers of the cylinders of said engine, including said fuel entrance means, said electronic fuel injector including a through passageway, an inlet opening to said through passageway of said fuel injector, an outlet opening to said through passageway of said fuel injector, fuel injector closure means to open, close and vary the opening of said through passageway of said fuel injector responsive to said control signals from said electronic control module, said inlet of said through passageway of said fuel injector being positioned in registration with said control flow inlet port opening to said control pressure chamber, said outlet of said through passageway of said fuel injector being positioned to open to said control pressure chamber, a first fuel pressure regulator in said first fuel line to reduce fuel pressure therein to a range which includes one hundred pounds per square inch, a third fuel line leading from said first fuel line on the downstream side of said first fuel pressure regulator to said control flow inlet port opening to said control pressure chamber of said pilot control valve, a second fuel pressure regulator in said third fuel line to reduce fuel pressure therein to a range which includes thirty pounds per square inch.

11. A dual fuel system for an internal combustion engine as set forth in claim 10, wherein said entrance means to a manifold leading to combustion chambers of the cylinders of said engine comprise a venturi mixer having a venturi passageway therethrough, a throttle body having a through passageway in registration with said venturi passageway and downstream therefrom.

12. A dual fuel system for an internal combustion engine as set forth in claim 11, including an air passageway through said venturi mixer and said throttle body, having an air intake which opens at one end to receive a flow of ambient air into said air passageway and an air outlet which opens at the other end to said through passageway of said throttle body.

13. A dual fuel system for an internal combustion engine as set forth in claim 10, including an output adjustment valve movable between an open and closed position and positioned to vary the cross-sectional opening of said primary flow passageway of said pilot control valve.

14. A dual fuel system for an internal combustion engine as set forth in claim 10, including a pilot pressure adjustment valve movable between an open and closed position and positioned to vary the cross-sectional opening of the outlet port from said control pressure chamber of said pilot control valve, including said outlet port thereof.

15. A dual fuel system for an internal combustion engine as set forth in claim 10, including an idle compensation adjustment valve movable between an open and closed position and positioned to vary the cross-sectional opening of an idle fuel passageway of said pilot control valve, including said idle fuel passageway thereof.

* * * * *